United States Patent
Le et al.

(10) Patent No.: US 6,769,480 B2
(45) Date of Patent: Aug. 3, 2004

(54) TORQUE BALANCING APPARATUS AND METHOD FOR AN AUTOMOTIVE TEMPERATURE CONTROL SYSTEM

(75) Inventors: Vu Le, Huntington Woods, MI (US); Thomas Dippel, Neuhemsbach (DE)

(73) Assignee: TRW Inc., Lyndhurst, OH (US)

(*) Notice: Subject to any disclaimer, the term of this patent is extended or adjusted under 35 U.S.C. 154(b) by 0 days.

(21) Appl. No.: 09/951,851

(22) Filed: Sep. 13, 2001

(65) Prior Publication Data

US 2003/0047306 A1 Mar. 13, 2003

(51) Int. Cl.[7] .................................................. B60H 1/00
(52) U.S. Cl. .......................... 165/203; 165/42; 165/96; 236/12.15; 236/91 D
(58) Field of Search ........................ 165/203, 42, 96; 236/12.15, 91 D; 74/625, 89.38

(56) References Cited

U.S. PATENT DOCUMENTS

| | | | |
|---|---|---|---|
| 3,702,529 A | * | 11/1972 | Zeter et al. |
| 3,715,961 A | * | 2/1973 | Erlichman |
| 3,946,436 A | * | 3/1976 | Takashino |
| 3,983,930 A | | 10/1976 | Franz |
| 4,211,401 A | * | 7/1980 | Cunard |
| 4,406,322 A | | 9/1983 | Rossi et al. |
| 4,510,590 A | * | 4/1985 | Girton et al. |
| 5,042,315 A | * | 8/1991 | Fahy et al. |
| 5,062,352 A | | 11/1991 | Ostrand |
| 5,606,893 A | | 3/1997 | Shifflett |
| 5,701,752 A | | 12/1997 | Tsunokawa et al. |
| 5,774,755 A | * | 6/1998 | Stanchus et al. |
| 5,778,269 A | * | 7/1998 | Williams |
| 5,964,427 A | * | 10/1999 | Aiston |
| 6,032,723 A | * | 3/2000 | Tsuihiji et al. ................ 165/42 |
| 6,036,594 A | | 3/2000 | Kwon et al. |
| 6,092,376 A | | 7/2000 | Lake et al. |
| 6,134,835 A | * | 10/2000 | Krupke et al. |
| 6,179,044 B1 | | 1/2001 | Tabara |
| 6,305,462 B1 | * | 10/2001 | Tsurushima et al. ...... 165/42 X |
| 6,347,988 B1 | * | 2/2002 | Kurokawa et al. ........ 165/42 X |
| 6,431,266 B1 | * | 8/2002 | Han ......................... 165/42 X |
| 6,561,704 B2 | * | 5/2003 | Richiuso et al. |

* cited by examiner

Primary Examiner—Ljiljana Ciric
(74) Attorney, Agent, or Firm—Tarolli, Sundheim, Covell & Tummino L.L.P.

(57) ABSTRACT

An apparatus (100) controls the temperature of air flow from a temperature control system (10) The apparatus (100) includes a blend door (150), an output gear (140), and a biasing mechanism (124) The biasing mechanism (124) facilitates rotation of the output gear (140) in a first rotation direction (136) and impedes rotation of the output gear (140) in a second rotation direction (138) opposite the first rotation direction (136) This results in the torque necessary to rotate the output gear (140) in the first rotation direction (136) being substantially equal to the torque necessary to rotate the output gear (140) in the second rotation direction (138).

24 Claims, 3 Drawing Sheets

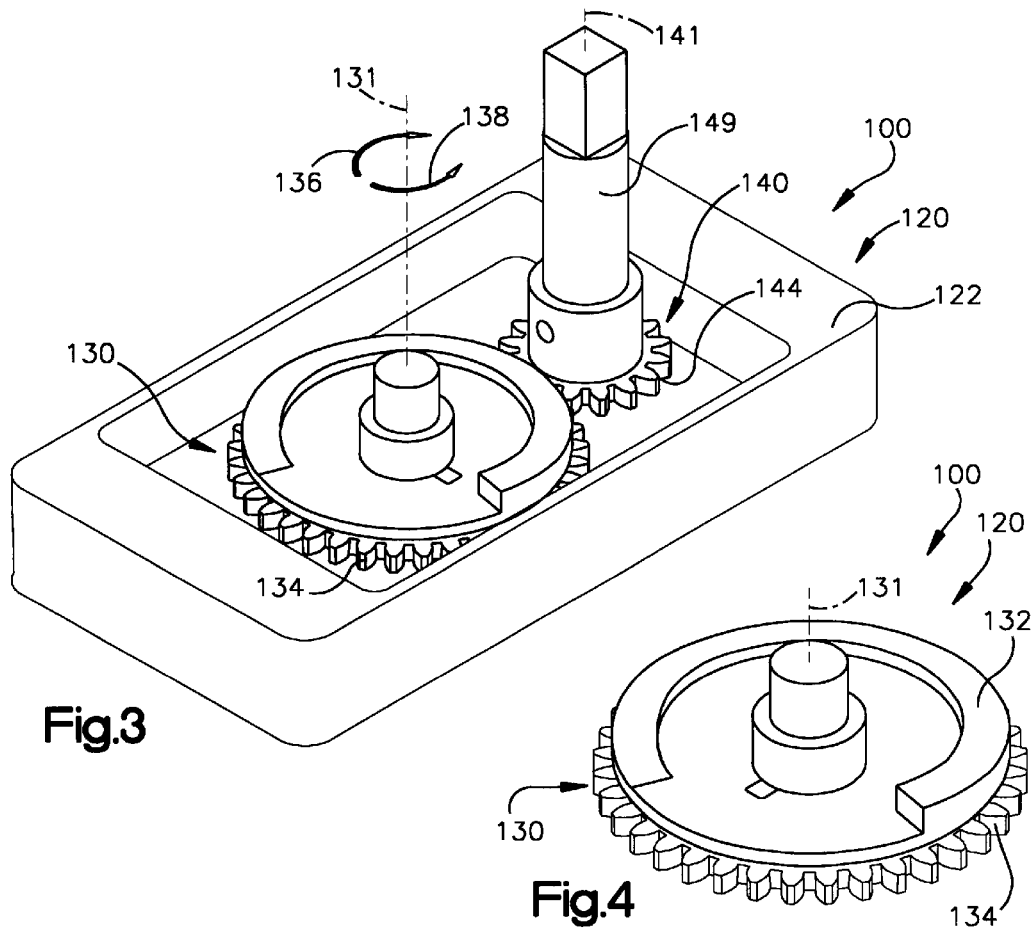
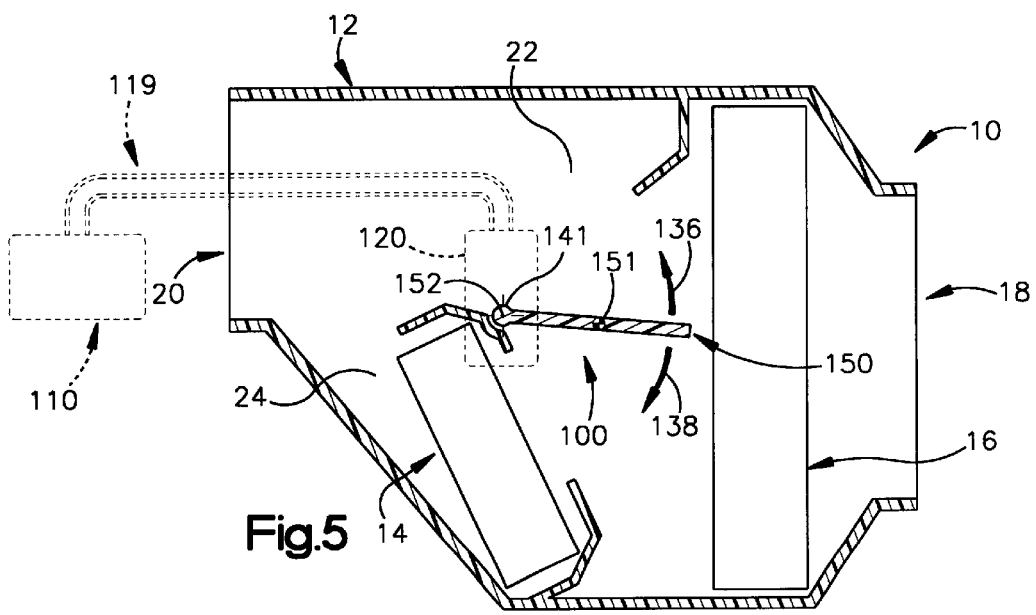

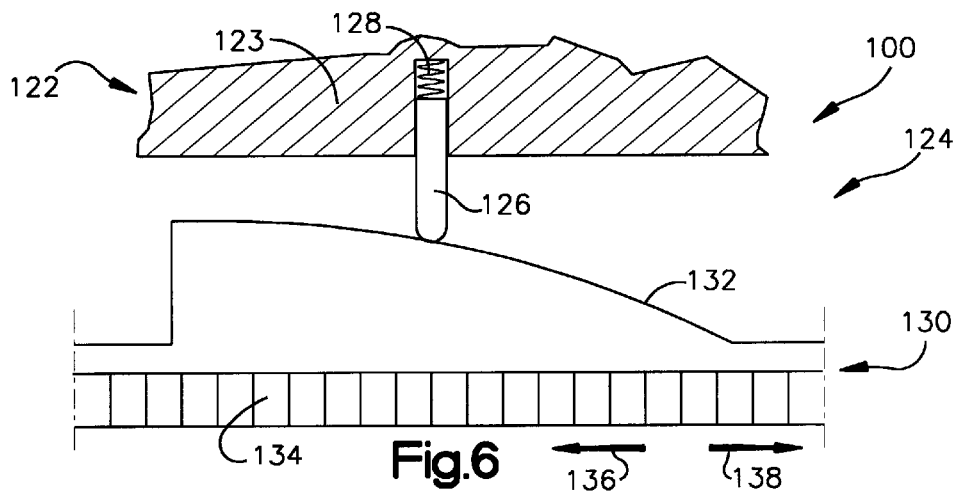
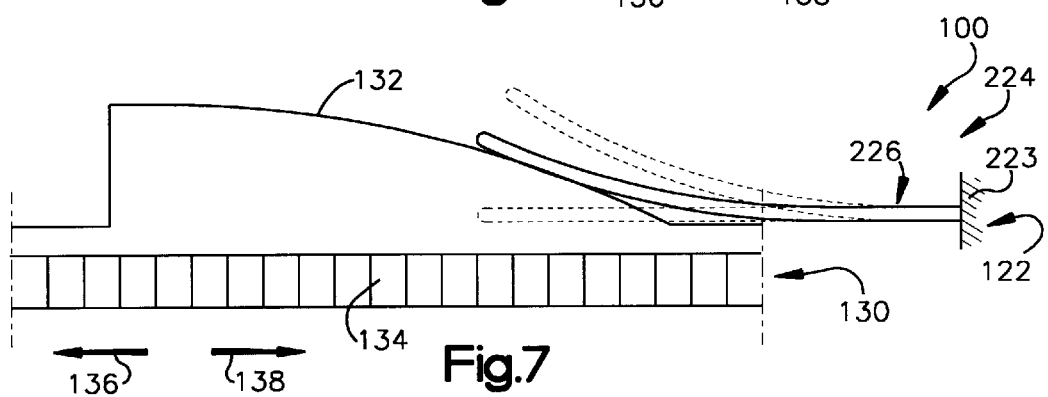
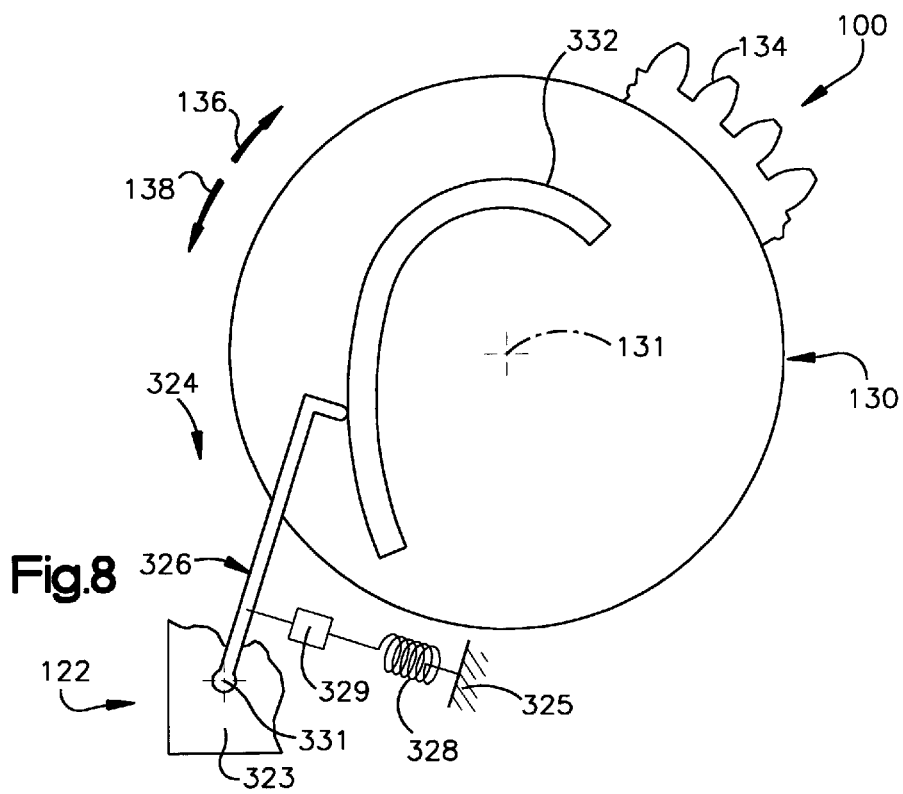

TORQUE BALANCING APPARATUS AND METHOD FOR AN AUTOMOTIVE TEMPERATURE CONTROL SYSTEM

FIELD OF THE INVENTION

The present invention relates to an automotive temperature control system and, more particularly, to an apparatus for balancing the torque necessary to adjust the temperature of the air flow produced by the automotive temperature control system.

BACKGROUND OF THE INVENTION

A conventional apparatus controls the output temperature of an automotive temperature control system by controlling the position of a mechanical blend door that resides within the automotive temperature control system. This blend door determines the amount of air flow that passes through a heater core and the amount of air flow that bypasses the heater core. The most economical control apparatus for the blend door is a completely mechanical actuator that requires no electrical or pneumatic assistance. The source of power for the conventional mechanical actuator is the human hand. A person may operate this mechanical actuator by rotating a temperature control knob that is typically mounted on an instrument panel of a vehicle.

Since a human hand powers the mechanical actuator, the output torque produced by the mechanical actuator is very low. Also, the human hand is sensitive to the variations of torque required to adjust the position of the blend door. For a conventional automotive temperature control system, the weight of the blend door is the main cause of the torque variations that the human hand feels.

DESCRIPTION OF THE PRIOR ART

This problem has been previously addressed by attaching a counterweight to the blend door so that the torque necessary to move the door upward or downward is balanced. However, this small torque requirement also leads to undesirable vibration and even significant movement of the blend door due to the vibration and inertial forces created by an operating vehicle.

To create a cost efficient mechanical actuator that provides a consistent torque effort throughout the adjustment range of the blend door in both rotation directions, a counterbalancing mechanism in accordance with the present invention may be integrated into the design of the temperature control system. The counter-balancing mechanism offsets the weight of the blend door without undesirable vibration or movement of the blend door. As a result, the counterbalancing mechanism removes the input torque variations that the person feels as he or she adjusts the blend door in the pursuit of adjusting the output temperature of the temperature control system.

SUMMARY OF THE INVENTION

In accordance with one feature of the present invention, an apparatus controls a temperature of air flow from a temperature control system. The apparatus includes a blend door, an output gear, and a biasing mechanism. The blend door blocks air flow and has a plurality of positions, each blocking different amounts of air flow. The blend door is rotatable about a first axis between each of the plurality of positions. The output gear is secured to the blend door and is rotatable about the first axis to rotate the blend door between each of the plurality of positions. The biasing mechanism facilitates rotation of the output gear in a first rotation direction and impedes rotation of the output gear in a second rotation direction opposite the first rotation direction such that the torque necessary to rotate the output gear in the first rotation direction is substantially equal to the torque necessary to rotate the output gear in the second rotation direction. The biasing mechanism includes a ramping surface and a projecting member biasingly engaging the ramping surface.

In accordance with another feature of the present invention, an apparatus controls an output temperature of a temperature control system. The apparatus includes an output gear, an input gear, and a biasing mechanism. The output gear is rotatable about a first axis between a plurality of rotation positions. The input gear drives the output gear. The input gear is rotatable about a second axis parallel to the first axis to rotate the output gear to each of the plurality of rotation positions. The biasing mechanism facilitates rotation of the input gear in a first rotation direction and impedes rotation of the input gear in a second rotation direction opposite the first rotation direction such that the torque necessary to rotate the input gear in the first rotation direction is substantially equal to the torque necessary to rotate the input gear in the second rotation direction. The biasing mechanism includes a ramping surface on the input gear and a resilient structure for engaging the ramping surface.

In accordance with still another feature of the present invention, a method controls a temperature of air flow from a temperature control system. The method includes the following steps: rotating a first gear about a first axis in a first rotation direction; imparting rotation to a second gear and a blend door about a second axis parallel to the first axis in a second rotation direction opposite the first rotation direction by the rotating of the first gear in the first rotation direction; applying resistance to rotation of the first gear in the first rotation direction by biasing a projecting member against a ramping surface; rotating the first gear about the first axis in a third rotation direction opposite the first rotation direction; imparting rotation to the second gear and the blend door about the second axis in a fourth rotation direction opposite the second rotation direction by the rotating of the first gear in the third rotation direction; and applying assistance to rotation of the first gear in the third rotation direction by biasing the projecting member against the ramping surface such that the torque necessary to rotate the first gear in the first rotation direction is substantially equal to the torque necessary to rotate the first gear in the third rotation direction.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 3 is a perspective view of the part of the apparatus of FIG. 1;

FIG. 4 is a detailed perspective view of part of the apparatus of FIG. 3;

FIG. 5 is a schematic view of a temperature control system for use with the apparatus of FIG. 1;

FIG. 6 is a schematic view of one feature of the apparatus of FIG. 1;

FIG. 7 is a schematic view of another feature of the apparatus of FIG. 1; and

FIG. 8 is a schematic view of still another feature of the apparatus of FIG. 1.

DESCRIPTION OF PREFERRED EMBODIMENT

Figure 1:
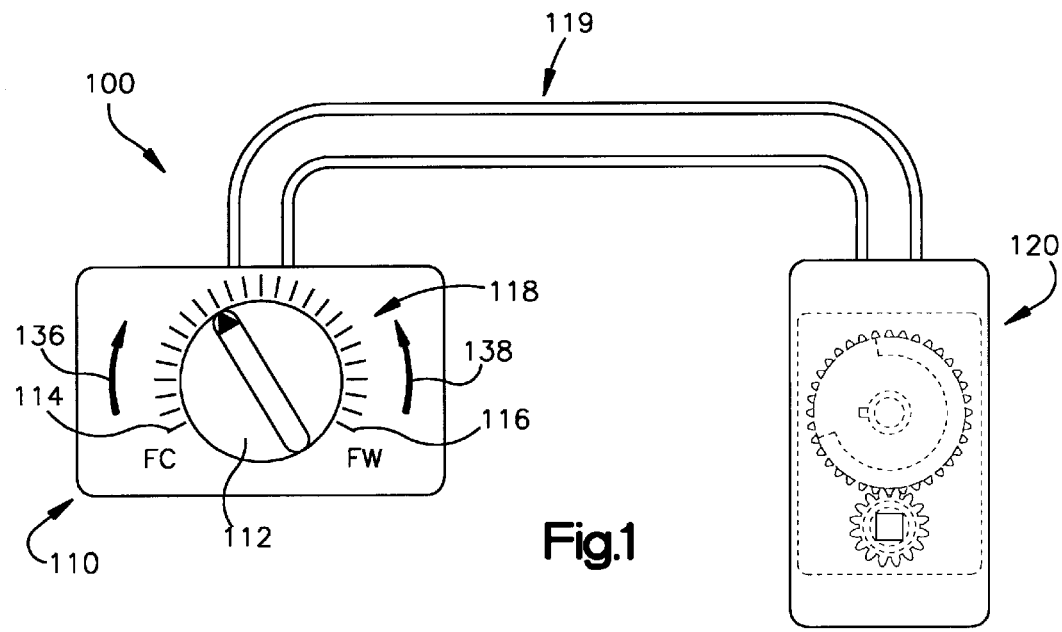
FIG. 1 is a schematic view of an apparatus in accordance with the present invention.

In accordance with the present invention, FIG. 1 illustrates an apparatus 100 for use with an automotive temperature control system 10 (FIG. 5). The apparatus 100 controls the temperature of air flow from the temperature control system 10. The apparatus 100 includes a climate control unit 110, a mechanical actuator 120, and a blend door 150 (FIG. 5).

As viewed schematically in FIG. 1, the climate control unit 110 interfaces with an occupant of a vehicle. The climate control unit 110 is typically mounted on an instrument panel of the vehicle. The climate control unit 110 includes a manually rotatable temperature control knob 112. The occupant controls the output temperature of the temperature control system 10 by rotating the temperature control knob 112 between the positions of Full-Cool 114 and Full-Warm 116. The temperature control knob 112 typically has detent mechanisms (not shown) that provide a tactile feel so that the occupant may position the temperature control knob at distinct 10° increments. The increments are indicated by the lines 118. The rotation of the temperature control knob 112 creates a linear motion of cables (not shown) that move within a conduit 119 (as is known in the art). The cables are attached to the mechanical actuator 120 and transfer the rotation of the temperature control knob 112 to the mechanical actuator 120.

Figure 2:
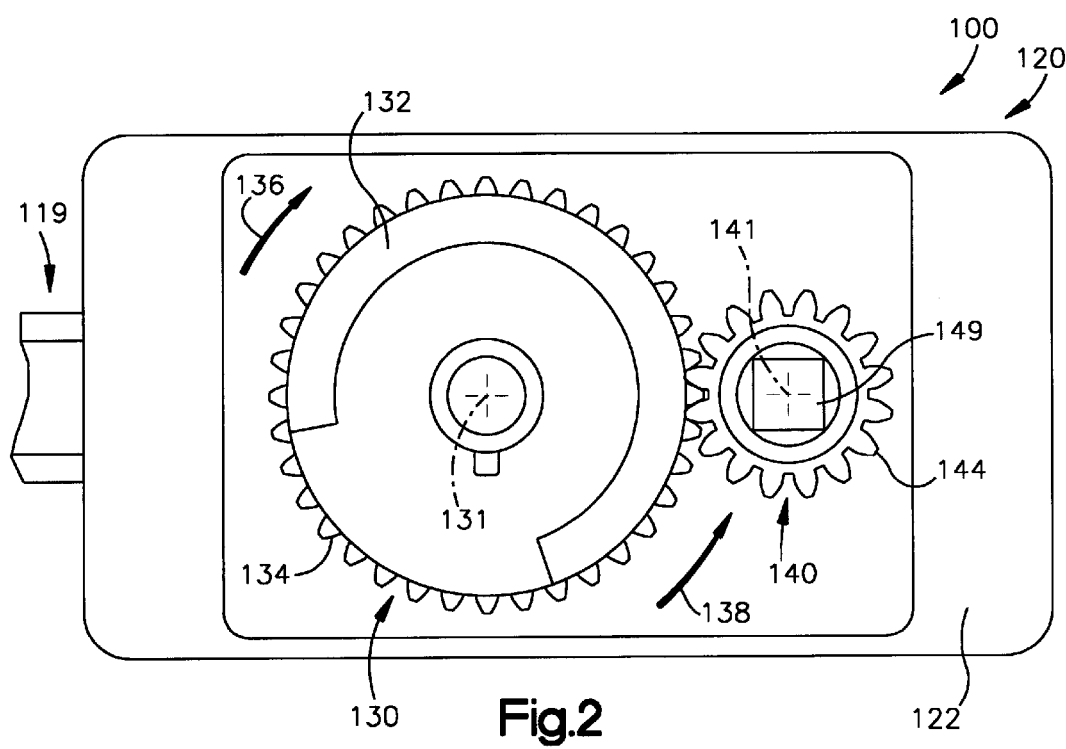
FIG. 2 is an enlarged schematic view of part of the apparatus of FIG. 1.

As viewed in FIG. 2, the mechanical actuator 120 includes a housing 122, an input gear 130 secured in the housing and rotatable about an input axis 131 in the housing, an output gear 140 secured in the housing and rotatable about an output axis 141 parallel to the input axis, and a biasing mechanism 124, 224, or 324 (FIGS. 6–8). The input gear 130 is rotated by the cables of the conduit 119 when the temperature control knob 112 is similarly rotated (as is known in the art). The input gear 130 has teeth 134 in meshing engagement with teeth 144 on the output gear 140. The input gear 130 imparts opposite rotation to the output gear 140 as the input gear rotates and drives the output gear.

When rotated, the input gear 130 transmits torque to the output gear 140. The output gear 140 is attached to an output shaft 149. The output gear 140 rotates the output shaft 149. The output shaft 149 is attached to a blend door shaft 152 of the blend door 150 (FIG. 5).

As viewed in FIG. 5, the temperature control system 10 includes a system housing 12, a heater core 14, and an evaporator core 16 for use with the blend door 150 of the apparatus 100. An air flow enters the system housing 12 at an entrance 18. The air flow passes through the evaporator core 16. The evaporator core 16 cools and dehumidifies the air flow. The position of the blend door 150 determines whether and how much of the air flow is blocked and/or passes through the heater core 14. Cold air flow 22 and hot air flow 24 are mixed together at an exit 20 of the temperature control system 10.

As viewed in FIGS. 3, 4, 6, and 7, the biasing mechanism 124 or 224 may have a ramping surface 132 along the outer diameter of the input gear 130. The ramping surface 132 defines an annular surface that is axially sloped relative to the input axis 131 and extends tangentially around the circular perimeter of the input gear 130. The shape of the ramping surface 132 may be determined by mathematical calculation for optimum control of the apparatus 100. As viewed in FIGS. 6 and 7, the ramping surface 132 is slightly concave and curved toward the body of the input gear 130.

As viewed in FIG. 6, the biasing mechanism 124 may further include a resilient structure such as a projecting plunger-type member 126 axially biased against the ramping surface 132 such that the torque necessary to rotate the input gear 130 in a first rotation direction 136 is substantially equal to the torque necessary to rotate the input gear in a second rotation direction 138 opposite the first rotation direction. The plunger-type member 126 and a compressed spring member 128 are secured in a portion 123 of the housing 122 and provide a continuous axial biasing force against the ramping surface 132 as the input gear 130 rotates about the input axis 131. The curvature and slope of the ramping surface 132 convert the axial biasing force into components of axial force against the body of the input gear 130 and rotational force against the input gear about the input axis 131.

As viewed in FIG. 7, an alternative biasing mechanism 224 may include a resilient structure such as a projecting cantilever-type member 226 resiliently biased against the ramping surface 132 such that the torque necessary to rotate the input gear 130 in the first rotation direction 136 is substantially equal to the torque necessary to rotate the input gear in the second rotation direction 138. The deflected cantilever-type member 226, acting as a flexure spring, is secured to a portion 223 of the housing 122 and provides a continuous axial biasing force against the ramping surface 132 as the input gear 130 rotates about the input axis 131. The curvature and slope of the ramping surface 132 convert the axial biasing force into components of axial force against the body of the input gear 130 and rotational force against the input gear about the input axis 131.

As viewed in FIG. 8, another biasing mechanism 324 may include a resilient structure such as a projecting pivoting-type member 326 biased against a radially curved ramping surface 332 (instead of the ramping surface 132) such that the torque necessary to rotate the input gear 130 in the first rotation direction 136 is substantially equal to the torque necessary to rotate the input gear in the second rotation direction 138. The shape of the ramping surface 332 may be determined by mathematical calculation for optimum control of the apparatus 100. The ramping surface 332 is curved around the input axis 131 and extends axially away from the body of the input gear 130.

The L-shaped pivoting-type member 326 is rotatable about a pivot axis 331 and is rotatably secured to a portion 323 of the housing 122. The pivot axis 331 is typically parallel to the input axis 131 and the output axis 141. A stretched spring member 328 is secured to another portion 325 of the housing 122 and provides a continuous rotational biasing force against the pivoting-type member 326 about the pivot axis 331 and thereby a continuous radial biasing force against the ramping surface 332 as the input gear 130 rotates about the input axis 131. The curvature of the ramping surface 332 converts the radial biasing force into components of radial biasing force against the center of the input gear 130 and rotational force against the input gear about the input axis 131.

In operation, the weight of the blend door 150 creates a torque $T_{door}$ about the output axis 141. The torque $T_{door}$ is generated at the center of gravity 151 of the blend door 150 (FIG. 5). Due to the weight of the blend door 150, the torque $T_{door}$ causes the required input torque at the temperature control knob 112 to be greater when it is rotated from Full-Cool 114 to Full-Warm 116 (a first rotation direction 136) than in the opposite direction from Full-Warm to Full-Cool (a second rotation direction 138).

When the temperature control knob 112 is rotated in the first rotation direction 136, the blend door 150 is pivoted upward, or lifted. When the temperature control knob 112 is rotated in the second rotation direction 138, the blend door 150 is pivoted downward, or lowered. The heavier the blend door 150, the greater the difference of torque between the two opposite rotational directions 136 and 138. This situation occurs whenever a blend door moves in the vertical direction, regardless whether it is the pivoting door 150 of FIG. 5 or a sliding door (not shown).

Since the temperature control knob 112 is operatively engaged with the blend door 150, the human hand can feel the torque difference when rotating the temperature control knob in each direction. A temperature control system that has drastic temperature control knob torque differences between opposite rotational directions may give a vehicle occupant the impression of a low quality temperature control system.

To compensate for the weight of the blend door 150, the ramping surface 132 or 332 has been added to the input gear 130. The projecting member 126, 226, or 326 contacts the ramping surface 132 or 332 and exerts a force on the ramping surface due to the spring member 128 or 328 or the projecting member 226 itself. As discussed above, the shape of the ramping surface 132 or 332 may be generated by a mathematical equation that allows control of the resultant forces at the interface of the ramping surface 132 or 332 and the projecting member 126, 226, or 326.

Each increment of rotation of the temperature control knob 112 may impart a proportional amount of same direction rotation to the input gear 130 through the conduit 119. As the temperature control knob 112, and thereby the input gear 130, are rotated in the first rotation direction 136 (i.e., clockwise as viewed in FIG. 1), the required input torque to the temperature control knob is governed by the following equation:

$$T_{knob} = T_{detent} + T_{friction} + T_{door} - T_{bias1}$$

where:

$T_{knob}$=input torque at the temperature control knob;

$T_{detent}$=torque caused by the detent mechanisms;

$T_{friction}$=torque generated by the actuator due to internal friction;

$T_{door}$=torque generated by the weight of the blend door; and $T_{bias1}$=resultant torque due to the biasing mechanism.

The detent torque $T_{detent}$ is a constant torque that one of the detent mechanisms generates to ensure that the blend door 150 remains stationary once the occupant releases the temperature control knob 112. The friction torque $T_{friction}$ is the unavoidable torque that is added to the input torque requirements of any mechanical actuator due to friction forces generated at all contact surfaces within the mechanical actuator 120, the climate control unit 110, and the conduit 119.

The biasing mechanism torque $T_{bias1}$ is the resultant torque due to the biasing mechanism 124, 224, or 324 when the blend door 150 is being raised (i.e., pivoted counter-clockwise as viewed in FIG. 5). As the blend door 150 pivots upward, the ramping surface 132 or 332 moves away from the projection member 126, 226, or 326. The forces generated at the projecting member-to-ramping surface interface thereby assist rotation of the input gear 130 and generate the resulting torque $T_{bias1}$. The magnitude of $T_{bias1}$ is typically small compared to the other torque values discussed above.

When the temperature control knob 112, and thereby the input gear 130, are rotated in the second rotation direction 138 (i.e., counterclockwise as viewed in FIG. 1), the blend door 150 is lowered (i.e., pivoted clockwise as viewed in FIG. 5) and the directions of the torques $T_{detent}$ and $T_{friction}$ are reversed. The directions of $T_{detent}$ and $T_{friction}$ are always opposite of the rotational direction of the temperature control knob 112 and the input gear 130. The direction of $T_{door}$ is in the same direction as before, however, since $T_{door}$ is created by gravity.

Now the ramping surface 132, 332 is moving toward the projecting member 126, 226, 326 and is causing the spring member 128 to be compressed more, the cantilever-type member 226 to be deflected more, or the spring member 328 to be stretched, or extended, more. The compression/deflection/extension of the spring members 128, 226, 328 generates a force on the ramping surface 132, 332 that resists rotation of the input gear 130. The resulting force at the projecting member-to-ramping surface interface creates the resulting torque of $T_{bias2}$. The magnitude of $T_{bias2}$ is typically much larger than $T_{bias1}$ and has the opposite direction of $T_{bias1}$.

As the temperature control knob 112, and thereby the input gear 130, are rotated in the second rotation direction 138, the required input torque to the temperature control knob is governed by the following equation:

$$T_{knob} = T_{detent} + T_{friction} - T_{door} + T_{bias2}$$

where:

$T_{knob}$=input torque at the temperature control knob;

$T_{detent}$=torque caused by the detent mechanisms;

$T_{friction}$=torque generated by the actuator due to internal friction;

$T_{door}$=torque generated by the weight of the blend door; and $T_{bias2}$=resultant torque due to the biasing mechanism.

By controlling the mechanical parameters of the spring members 128, 226, 328, the weight of the blend door 150 may be compensated for in a way that the human hand cannot feel a difference in input torque $T_{knob}$ between the opposite rotation directions 136 and 138 of the temperature control knob 112. The weight of the blend door 150 is essentially balanced by mathematically manipulating the relative magnitudes of $T_{bias1}$ and $T_{bias2}$ so that the final input torque $T_{knob}$ in both directions is substantially equal.

The projecting members 126, 226, 326 and spring members 128, 226, 328 are one way of providing a controlled force on the ramping surfaces 132, 332. There are many ways to provide a controlled force on the ramping surface 132, 332. As viewed in FIG. 6, the spring biased plunger-type member 126 may provide the force on the ramping surface 132. As viewed in FIG. 7, the flexible cantilever-type member 232 may provide the force on the ramping surface 132. As viewed in FIG. 8, the spring biased pivoting-type member 326 may provide the force on an alternative ramping surface 332. A flexible cantilever-type member (not shown) similar to the member 226 may also provide the force on the ramping surface 332.

As described above, the detent mechanisms maintain the blend door 150 in a fixed position once the human hand releases the temperature control knob 112. Due to the motion of the vehicle and the associated vibration, the weight of the blend door 150 may cause the blend door to start moving downward despite the detent mechanisms. The temperature control knob 112 would then rotate on its own as the blend door 150 "drifts" downward. This situation is known as "door walk". The heavier the blend door (i.e., a metal blend door), the more pronounced the door walk. Door walk can be mitigated with a biasing mechanism having a viscous damper. As viewed in FIG. 8, a viscous damper 329 may be included with the biasing mechanism 324. The viscous damper is connected in series with the spring member 328 at one end and the pivoting-type member 326 at the other end.

Alternatively, the viscous damper 328 may be connected in parallel with the spring member 328 with the portion 325 of the housing 122 at one end and the pivoting-type member 326 at the other end (not shown). Additionally, a damping device may be utilized with the biasing mechanisms 124, 224 of FIGS. 6 and 7.

A method in accordance with the present invention controls a temperature of air flow from the temperature control system 10. The method includes the steps of: rotating a first gear 130 about a first axis 132 in a first rotation direction 136; imparting rotation to a second gear 140 and a blend door 150 about a second axis 142 parallel to the first axis 132 in a second rotation direction 138 opposite the first rotation direction 136 by the rotating of the first gear 130 in the first rotation direction 136; applying resistance to rotation of the first gear 130 in the first rotation direction 136 by biasing a projecting member 126, 226, or 326 against a ramping surface 132 or 332; rotating the first gear 130 about the first axis 132 in a third rotation direction 138 opposite the first rotation direction 136; imparting rotation to the second gear 140 and the blend door 150 about the second axis 142 in a fourth rotation direction 136 opposite the second rotation direction 138 by the rotating of the first gear 130 in the third rotation direction 138; and applying assistance to rotation of the first gear 130 in the third rotation direction 138 by biasing the projecting member 126, 226, or 326 against the ramping surface 132 or 332 such that the torque necessary to rotate the first gear 130 in the first rotation direction 136 is substantially equal to the torque necessary to rotate the first gear 130 in the third rotation direction 138.

The biasing steps of the method may further include axially biasing the projecting member 126 against the ramping surface 132 with the projecting member 126 extending axially toward the ramping surface 132. Alternatively, the biasing steps of the method may further include axially biasing the projecting member 226 against the ramping surface 132 with the projecting member 226 extending tangentially about the first gear 130.

From the above description of the invention, those skilled in the art will perceive improvements, changes and modifications. Such improvements, changes and modifications within the skill of the art are intended to be covered by the appended claims.

What is claimed is:

1. An apparatus for controlling the temperature of an air flow from a temperature control system, said apparatus comprising:

a blend door for blocking air flow, said blend door having a plurality of positions each blocking different amounts of air flow, said blend door being rotatable about a first axis between each of said plurality of positions;

an output gear secured to said blend door, said output gear being rotatable to rotate said blend door between each of said plurality of positions, said blend door being effective to provide force impeding rotation of said output gear in a first rotation direction and facilitating rotation of said output gear in a second rotation direction; and a biasing mechanism for facilitating rotation of said output gear in a the first rotation direction and impeding rotation of said output gear in the second rotation direction opposite said first rotation direction such that the torque necessary to rotate said output gear in said first rotation direction is substantially equal to the torque necessary to rotate said output gear in said second rotation direction, said biasing mechanism including a ramping surface and a projecting member which biasingly engages said ramping surface and which applies force to said ramping surface facilitating rotation of said output gear in the first rotation direction and impeding rotation of said output gear in the second rotation direction.

2. The apparatus as set forth in claim 1 further including an input gear for engaging said output gear, said input gear being rotatable about a second axis, said ramping surface of said biasing mechanism being disposed on said input gear.

3. The apparatus as set forth in claim 2 further including a control knob for manually rotating said input gear.

4. The apparatus as set forth in claim 2 further including an actuator housing for said output gear and said input gear, said housing supporting said projecting member and securing said projecting member in engagement with said ramping surface.

5. The apparatus as set forth in claim 2 wherein said ramping surface is sloped in a direction extending along said second axis, said ramping surface has an arcuate configuration and curves around said second axis.

6. The apparatus as set forth in claim 5 wherein said projecting member extends along said second axis and is pressed against said ramping surface.

7. The apparatus as set forth in claim 5 wherein said projecting member comprises a cantilever spring member which extends transverse to said second axis and presses against said ramping surface.

8. The apparatus as set forth in claim 2 wherein said input gear has opposite sides which face in opposite directions along said second axis, said ramping surface being disposed on one of said sides of said input gear.

9. The apparatus as set forth in claim 8 wherein said biasing mechanism includes a spring element for biasing said projecting member into engagement with said ramping surface.

10. The apparatus as set forth in claim 9 wherein said projecting member is pivotable about a third axis which is spaced from said first and second axes.

11. An apparatus for controlling an output temperature of a temperature control system, said apparatus comprising:

a blend door which is movable between a first position at least partially blocking air flow along a first path and a second position at least partially blocking air flow along a second path;

an output gear connected with said blend door and rotatable about a first axis between a plurality of rotation positions;

an input gear for driving said output gear, said input gear being rotatable about a second axis to rotate said output gear to each of said plurality of rotation positions, said blend door being effective to provide a force which impedes rotation of said output gear in a first rotation direction and facilitates rotation of said output gear in a second rotation direction; and a biasing mechanism for facilitating rotation of said input gear in the first rotation direction and impeding rotation of said input gear in the second rotation direction such that the torque necessary to rotate said input gear in said first rotation direction is substantially equal to the torque necessary to rotate said input gear in said second rotation direction, said biasing mechanism including a ramping surface on said input gear and a resilient structure which applies force to said ramping surface during movement of said blend door between the first and second positions.

12. The apparatus as set forth in claim 11 wherein said ramping surface slopes in a direction extending along said second axis, said ramping surface having an arcuate configuration and extends at least part way around said second axis.

13. The apparatus as set forth in claim 12 wherein said resilient structure extends axially toward said ramping surface and one end of said resilient structure is biased against said ramping surface.

14. The apparatus as set forth in claim 11 wherein said resilient structure includes a spring member which provides force which is transmitted to said ramping surface.

15. The apparatus as set forth in claim 11 wherein said ramping surface is curved about said second axis and extends outward from one side of said input gear.

16. The apparatus as set forth in claim 11 wherein said resilient structure includes a coil spring element which presses a member against said ramping surface.

17. The apparatus as set forth in claim 16 wherein said member is rotatable about a third axis parallel to said second axis.

18. An apparatus for controlling the temperature of an airflow from a temperature control system, said apparatus comprising:

a blend door which is movable between a first position at least partially blocking air flow along a first path and a second position at least partially blocking air flow along a second path, a drive system connected with said blend door and operable to move said blend door between the first and second positions, said blend door being effective to apply to said drive system a first force which varies and which facilitates operation of said drive system during movement of said blend door from the first position to the second position, said blend door being effective to apply to said drive system a second force which varies and which impedes operation of said drive system during movement of said blend door from the second position to the first position, a biasing assembly which is connected with said drive system, said biasing assembly being operable to apply to said drive system a third force which varies and which impedes operation of said drive system during movement of said blend door from the first position to the second position, said biasing assembly being operable to apply to said drive system a fourth force which varies and which facilitates operation of said drive system during movement of said blend door from the second position to the first position, said biasing assembly being operable to vary said third force as a function of variations in said first force during movement of said blend door from the first position to the second position, said biasing assembly being operable to vary said fourth force as a function of variations in said second force during movement of said blend door from the second position to the first position.

19. An apparatus as set forth in claim 18 wherein said drive system includes a gear which is moved in a first direction during movement of said blend door from the first position to the second position and is moved in a second direction during movement of said blend door from the second position to the first position, said biasing assembly includes a ramp connected with said gear and a member disposed in engagement with said ramp, said member being effective to apply force against said ramp.

20. An apparatus as set forth in claim 18 wherein said drive system includes an output gear connected with said blend door and rotatable about a first axis between a plurality of rotation positions, and an input gear for driving said output gear, said input gear being rotatable about a second axis to rotate said output gear, said biasing assembly including a ramp which is rotatable with said input gear and a resilient structure which applies force to said ramp.

21. A method of controlling the temperature of an air flow from a temperature control system, said method comprising the steps of:

manually rotating an input member in a first rotational direction to move a blend door in a first direction;

manually rotating the input member in a second rotational direction to move the blend door in a second direction;

transmitting from the blend door to the input member a first force which assists rotation of the input member in the first rotational direction during manual rotation of the input member in the first rotational direction and movement of the blend door in the first direction;

transmitting from the blend door to the input member a second force which resists rotation of the input member in the second rotational direction and movement of the blend door in the second direction; and maintaining the torque required to manually rotate the input member substantially constant during rotation of the input member in the first and second rotational directions by transmitting to the input member a first biasing force which resists rotation of the input member in the first rotational direction during manual rotation of the input member in the first rotational direction and movement of the blend door in the first direction and by transmitting to the input member a second biasing force which assists rotation of the input member in the second rotational direction during manual rotation of the input member in the second rotational direction.

22. An apparatus for controlling the temperature of an air flow from a temperature control system, said apparatus comprising:

a blend door having a plurality of positions in which said blend door blocks different amounts of air flow along a path of air flow;

a manually actuatable drive system connected with said blend door and manually operable to move said blend door between said positions, said blend door being effective to apply force to said drive system in a direction facilitating manual operation of said drive system during movement of said blend door away from a first one of said positions toward a second one of said positions, said blend door being effective to apply force to said drive system in a direction impeding manual operation of said drive system during movement of said blend door away from said second one of sad positions toward said first one of said positions; and a biasing assembly which is connected with said drive system and is effective to maintain force which is required to manually operate to said drive system substantially constant during movement of said blend door toward and away from said first and second positions, said biasing assembly being operable to apply force to said drive system in a direction impeding manual operation of said drive system during movement of said blend door away from said first one of said positions and toward said second one of said positions, said biasing assembly being operable to apply force to said drive system in a direction facilitating manual operation of said drive system during movement of said blend door toward said first one of said positions and away from said second one of said positions.

23. An apparatus as set forth in claim 22 wherein said drive system includes a gear which is moved in a first direction during movement of said blend door away from said first position toward said second position and is moved in a second direction during movement of said blend door away from said second position toward said first position, said biasing assembly includes a ramp connected with said gear and a member disposed in engagement with said ramp, said member being effective to apply force against said ramp.

24. An apparatus as set forth in claim 22 wherein said drive system includes an output gear connected with said blend door and rotatable about a first axis between a plurality of rotation positions, and an input gear for driving said output gear, said input gear being rotatable about a second axis to rotate said output gear, said biasing assembly including a ramp which is rotatable with said input gear and a resilient structure which applies force to said ramp.

* * * * *